Patented July 2, 1940

2,206,407

UNITED STATES PATENT OFFICE 2,206,407

METHOD OF PREPARING ALKALOIDS FROM "TAMASAKI-TSUZURAFUJI" (STEPHANIA CEPHARANTHA, HAYATA) OF THE MENISPERMACEAE FAMILY

Heisaburo Kondo, Shibuya-ku, Tokyo, Shuji Hasegawa, Ebara-ku, Tokyo, and Masao Tomita, Toshima-ku, Tokyo, Japan No Drawing. Application June 28, 1938, Serial No. 216,286

2 Claims. (Cl. 260—236)

This invention relates to a method of preparing alkaloids from "Tamasaki - tsuzurafuji" (*Stephania cepharantha,* Hayata), a plant of the Menispermaceae family, which consists in separating the secondary base, isotetrandrin, by firstly treating with acetone all the alkaloids obtained by the ordinary process from "Tamasaki-tsuzurafuji" (*Stephania cepharantha,* Hayata) of the Menispermaceae family, then separating sepharanthine, the primary base as a crystalline addition compound of aromatic hydrocarbon by adding aromatic hydrocarbon such as benzene or toluene to the mother liquor of isotetrandrine, namely, acetone solution of the primary base, cepharanthine and liberating cepharanthine from compound by treatment with acid and then with alkali. The object thereof is to provide a remedy for tuberculous diseases by separating in a pure state all the akaloids contained in "Tamasaki-tsuzurafuji."

In this invention, the alcohol extract of "Tamasaki-tsuzurafuji" is firstly prepared from its tuberous root or stem and nextly all the alkaloids contained therein are firstly extracted completely by treating it with acid, alkali and organic solvent by the ordinary process. If they are treated with acetone, firstly the secondary base, isotetrandrine is separated as a crystal. Next, after removing the solvent, the mother liquor from which the secondary base has been taken away, is dissolved in ether and the solution is shaken together with caustic soda solution, thereby dissolving phenolic base in caustic soda solution. On the other hand, after removing the solvent from the ether solution, the primary base, cepharanthine is separated as a crystalline additional compound of aromatic hydrocarbon by the addition of aromatic hydrocarbon such as benzene, toluene, etc. to aceton solution and also is refined by re-crystallisation. Then, it is liberated by treatment with alkali. Thus, separating succeedingly and refining all the alkaloids and crystallizing them out as pure substances, there are produced various kinds of alkaloids effective especially for the treatment of tuberculous diseases.

The following are examples of carrying out the present invention into practice:—

Cut the tuberous root and stem of "Tamasaki-tsuzurafuji" (*Stephania cepharantha,* Hayata) into small pieces and prepare alcohol extract with alcohol of the quantity 5 times as big. After the addition of 2% hydrochloric acid of the quantity 10 times as big, lixiviate the mixture several times to dissolve the base in hydrochloric acid. Further, by the addition of ammonia water, render it alkaline and extract the thus-separated base with ether. Next, again dissolving the base in dilute hydrochloric acid, further render it alkaline by the addition of ammonia and extract it with ether. Then, distil the solvent from the solution extracted with ether, and all the alkaloids contained in "Tamasaki-tsuzurafuji" (*Stephania cepharantha,* Hayata) will be obtained as non-crystalline powder.

After dissolving 250 grams of the alkaloids in 2100 cubic centimeters of aceton, leave the solution alone in an ice cabinet, and then the crystal of the secondary base (isotetrandrine) will be separated (about 50 grams). Further, after removing the solvent from the acetone mother liquor from which the secondary base has been taken away, dissolve the residue in 2100 cubic centimeters of 5% hydrochloric acid, render it alkaline by the addition of caustic alkali and extract it repeatedly with ether. Dry the residue remaining after the solvent has been removed from the ether solution of base, and the primary base, namely crude cepharanthine will be obtained in an amorphous state. To refine it, dissolve 100 grams of the thus-produced crude base in 180 cubic centimeters of acetone and leave the solution alone after the addition of 45 cubic centimeters of benzene. Then, a large quantity of colorless needle-shaped crystals will be produced as a benzene addition compound. Next, separating such crystals, recrystallize the same, and the yield will be 70 grams. Liberate the combined benzene with 10% of acetic acid by dissolving the said benzene addition compound in the latter, and after concentrating the same under reduced pressure and removing benzene, render the solution alkaline by the addition of ammonia and liberate the base combined with acetic acid. Then, dissolve the thus-separated base with ether. If the ethereal solution has the solvent distilled away therefrom, pure cepharanthine is obtained.

If in the above operation exactly the same operation is carried out, employing toluene instead of benzene, a toluene additional compound of cepharanthine is obtained as a colorless needle-shaped crystal. Treat it in the same manner, and free cepharanthine will be obtained.

*Primary base*

Benzene additional compound of cepharanthine. Colorless needle-shaped crystal, melting point, 95–98° C.

Analysis shows its constitution as the numerical value obtained by adding 1 mol. of benzene to 1 mol. of cepharanthine.

*Toluene additional compound of cepharanthine*

Colorless needle-shaped crystal, melting point 98° C.

Analysis shows its constitution as agreeing with the numerical value obtained by adding 1 mol. of toluene to 1 mol. of cepharanthine.

Free cepharanthine

Pure white amorphous powder soluble in general organic solvents and difficult to crystallize. Its salts are soluble in water and hard to crystallize.

The constitution of free base is $C_{37}H_{38}N_2O_6 [\alpha]D^{21} = +204°$ (chloroform). Its methyliodide is a crystal with the melting point 253° C.

Secondary base

Isotetrandrine

Colorless needle-shaped crystal with the melting point 182° C. $[\alpha]D^{17} = +146°$ (chloroform). Its molecular formula is $C_{38}H_{42}N_2O_6$.

Tertiary base

The caustic alkaline mother liquor which remains after cepharanthine is collected with ether in the above example, is saturated with carbonic acid gas, and if the thus-separated base is extracted with ether and has the solvent removed therefrom, the tertiary base (phenolic base) is obtained, but has not yet been examined closely owing to its small quantity.

Action.—Using the above-stated substance, a study has been made of the experimental bacteriological treatment of tuberculosis and the following result been obtained:

Dividing twenty guinea pigs into two groups, 0.1 milligram of tuberculosis bacillus of human type was grafted underneath the skin of each group of the animals to be infected with a tuberculous disease. One of the groups was bred as it was by way of comparison, while the other had this substance grafted twice a week. At the end of seventy days both groups were killed at the same time by anaesthetization with ether. Upon comparing their tuberculosis-infected conditions, it has been found that the group which had received this substance was much less affected by tuberculosis.

Thus, it has been ascertained that this substance possesses the action of healing the experimental tuberculosis of the guinea pig.

We claim:

1. The process of preparing alkaloids from "Tamasaki-Tsuzurafuji" (*Stephania cepharantha*, Hayata), a plant of the Menispermaceae, which consists in extracting from said plant all the alkaloids contained therein, dissolving said alkaloids in acetone and cooling the solution thereby to cause precipitation of the secondary base, namely isotetrandine as a crystal and removing the same, distilling out the solvent from the mother liquid, dissolving the residue in ether, removing phenolic base from said ether solution by shaking it together with caustic soda solution, distilling out ether from the ether solution, dissolving the residue in acetone and adding aromatic hydrocarbon to said acetone solution so as to convert cepharanthine into a crystalline addition compound with said aromatic hydrocarbon and dissolving the crystals in acetic acid thereby to liberate the aromatic hydrocarbon, removing said aromatic hydrocarbon, and adding alkali to the residue thereby to reduce the base in the acetic acid to a free state.

2. The process of preparing alkaloids from "Tamasaki-Tsuzurafuji" (*Stephania cepharantha*, Hayata), a plant of the Menispermaceae, which consists in extracting from said plant all the alkaloids contained therein, dissolving said alkaloids in acetone and cooling the solution thereby to cause precipitation of the secondary base, namely isotetrandine, as a crystal and removing the same, distilling out the solvent from the mother liquid, dissolving the residue in ether, removing phenolic base from said ether solution by shaking it together with caustic soda solution, distilling out ether from the ether solution, dissolving the residue in acetone and adding benzene to said acetone solution so as to convert cepharanthine into a crystalline addition compound with benzene and dissolving the crystals in acetic acid thereby to liberate the benzene, removing said benzene, and adding alkali to the residue thereby to reduce the base in the acetic acid to a free state.

HEISABURO KONDO.
SHUJI HASEGAWA.
MASAO TOMITA.